United States Patent
Basuthakur et al.

[19]

[11] Patent Number: 6,089,509
[45] Date of Patent: Jul. 18, 2000

[54] SPACECRAFT ATTITUDE CONTROL USING ELECTRICAL POWER SUBSYSTEM

[75] Inventors: Sibnath Basuthakur, Phoenix; William Joe Haber, Tempe, both of Ariz.

[73] Assignee: Motorola, Inc., Schaumburg, Ill.

[21] Appl. No.: 08/831,119

[22] Filed: Apr. 1, 1997

[51] Int. Cl.$^7$ .................................................... B64G 1/32
[52] U.S. Cl. ............................................................ 244/166
[58] Field of Search ................................... 244/164, 166; 701/13

[56] References Cited

U.S. PATENT DOCUMENTS

| | | |
|---|---|---|
| 3,390,848 | 7/1968 | Crocker, II . |
| 3,838,834 | 10/1974 | Michaelis ................................. 244/166 |
| 5,158,250 | 10/1992 | Reboux .................................... 244/166 |
| 5,413,293 | 5/1995 | Gomberg et al. ....................... 244/166 |
| 5,540,405 | 7/1996 | Bender et al. .......................... 244/164 |
| 5,787,368 | 7/1998 | Gamble et al. ......................... 244/164 |

*Primary Examiner*—Galen L. Barefoot
*Attorney, Agent, or Firm*—Sherry J. Whitney; Timothy J. Lorenz

[57] ABSTRACT

A spacecraft (10) body (20) located in an external magnetic field (12) has a substantially unbalanced electrical power bus (18) that generates a composite local magnetic field The electrical power bus (18) substantially surrounds an external surface (22) of the spacecraft (10). Current in the electrical power bus (18) is solar panel (14and 16) and/or battery (34) generated and can flow in different directions through different current paths. Electrical loads (58) are coupled to power converters (56) and current path switches (54) to couple the power converters (56) to the various current paths. A controller (28) takes sensor data (82), determines a required attitude adjustment torque (84), translates that adjustment torque into a composite magnetic field (86), determines an unbalanced bus current profile (88) to generate that composite magnetic field, selects a current source (90) and regulates current path switches (92) to achieve a desired attitude adjustment torque for the spacecraft (10).

19 Claims, 6 Drawing Sheets

SPACECRAFT ATTITUDE CONTROL USING ELECTRICAL POWER SUBSYSTEM

FIELD OF THE INVENTION

The present invention relates generally to the field of spacecraft attitude control. More specifically, the present invention pertains to the use of torque generated by magnetic fields to control spacecraft attitude.

BACKGROUND OF THE INVENTION

Spacecraft attitude and orbit control are essential requirements for the successful deployment of a space based communication system. Orbit control or north-south stationkeeping requires relatively large and infrequent corrective maneuvers. These maneuvers are normally accomplished by the use of gas powered thrusters. On the other hand, the attitude of a spacecraft or satellite is frequently adjusted slightly due to a variety of disturbing torques or forces that alter the spacecraft's position and orientation beyond acceptable limits. These attitude disturbing torques are due primarily to environmental disturbances caused by solar pressure on the surface of the spacecraft, geometric asymmetry of the spacecraft and solar, lunar and earth gravitational and magnetic variations.

To compensate for environmental disturbance torques on orbiting spacecraft, several types of active attitude control systems have been developed. One such system uses the gas powered thrusters, that are primarily intended for station keeping, to correct for attitude disturbances. This is costly, makes only coarse attitude adjustments, is inconvenient and requires the additional mass of propellants for controlling spacecraft attitude.

Another system, known as solar sailing, uses solar radiation pressure acting on specific surfaces on the spacecraft that can be deployed and oriented by actuators. This technique adds weight to the system and reduces system reliability due to the addition of deployable control surfaces and their actuators.

A similar solar sailing system employs solar radiation pressure acting on the spacecraft solar panel surfaces that are oriented by the solar panel drive motors. Control moments generated by solar sailing are obtained by changing the orientation of at least one solar panel. Such a method produces an undesirable windmill torque which is typically compensated for by the use of an on-board momentum wheel which adds weight to the system. The windmill torque on these and similar systems leads to only coarse attitude adjustment. Moreover, when a solar panel is oriented for solar sailing it does not directly track the sun, resulting in a reduction in electrical power.

Another system for achieving attitude control uses on-board magnetically induced fields to react against the magnetic field of the earth or some other celestial body which the spacecraft might be orbiting. One such system entails the use of magnetic torque rods (current carrying coils wrapped around a ferromagnetic core) located inside the spacecraft to generate attitude adjusting torques. This system not only increases spacecraft weight but also unnecessarily consumes spacecraft electrical power. This power might otherwise be used to operate spacecraft payload components. Payload components are generally considered to be those components which execute the spacecraft function. For a communication satellite, payload components are communication equipment, including antennas, amplifiers and antenna directional equipment.

A similar magnetic torquing system uses magnetic torquing coils mounted on the solar wing or panel to generate attitude adjustment torques. This system increases spacecraft weight and requires solar energy to generate the electrical power for attitude control. Unfortunately, this solar energy may be occasionally unavailable. Moreover the torque produced by such a system is marginal due to the small amounts of current flowing through individual solar panel circuits.

Thus, the problem of attitude control of a spacecraft has not been completely solved Prior art attitude control systems increase spacecraft weight or require additional electrical battery power and yield only coarse attitude adjustment. Increasing spacecraft weight and/or electrical power requirements is undesirable because it reduces the useful life of a spacecraft and increases costs. Coarse attitude adjustments over undesirably large increments are not suitable for communication networks that use accurate attitude control to minimize the power required to maintain communication links. Such coarse attitude adjustments lead to misalignment of antennas.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE DRAWINGS

The preferred embodiments of the present invention are herein described in the context of a space based communication satellite/spacecraft in orbit about the earth. However, the invention can be applied to spacecraft orbiting other celestial bodies and to spacecraft traveling between celestial bodies in the presence of a sufficiently strong magnetic field.

Figure 1:
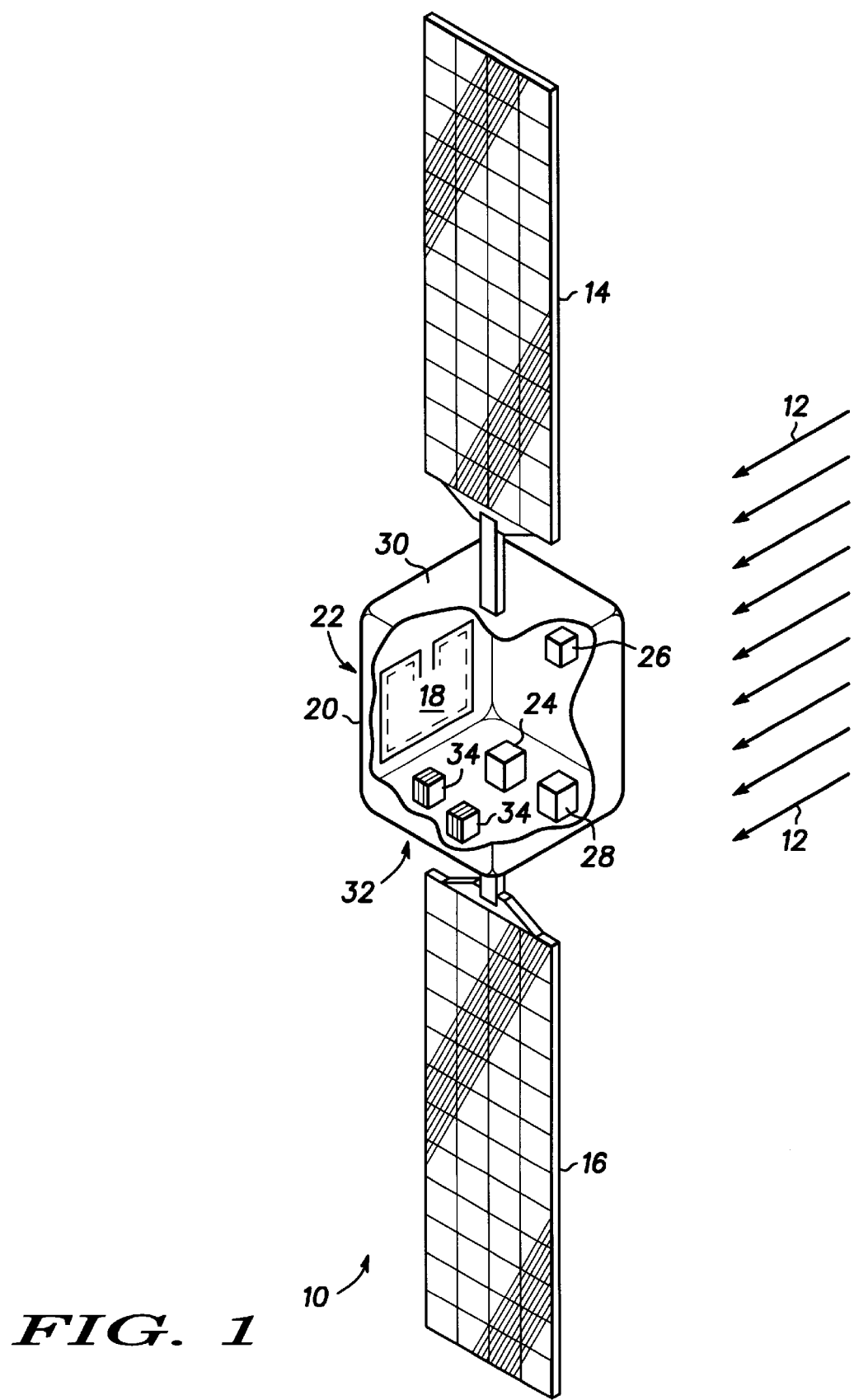
FIG. 1 shows a first perspective view of a spacecraft having symmetric solar panels and an unbalanced electrical power bus.

FIG. 1 shows a first perspective view of a spacecraft 10 located in an external magnetic field 12. Spacecraft 10 has symmetric solar panels 14 and 16 respectively that generate electrical power when solar energy is available. The electrical power is routed through an unbalanced electrical power bus 18. Spacecraft 10 also includes a body 20 having an external surface 22. FIG. 1 depicts body 20 as a cube for simplicity.

A variety of sensors are used to establish spacecraft attitude and orientation. Typically, these sensors include an Inertial Reference Unit (IRU) 24 and an Attitude Orbit Control System (AOCS) sensor suite 26. Information from these sensors is sent to a controller 28 which operates the attitude control components and actuators of spacecraft 10.

Solar panels 14 and 16 project outward from ends 30 and 32 of body 20, respectively. Electrical power generated by solar panels 14 and 16 is used to drive an electronic payload (not shown) and to charge batteries 34. The electronic payload may include a variety of communication devices and sensors depending upon the mission of spacecraft 10.

An electrical power bus 18 substantially surrounds body 20, is proximate to external surface 22 of body 20, and in one preferred embodiment encloses an area of approximately 3.5 meters square. Both positive (solid line) and negative (dashed line) conductors/legs of bus 18 are shown. Controller 28, regulates current flow through power bus 18, and in one preferred embodiment this current flow may range up to 200 A. It is this large amount of current encircling a significant area that produces a local magnetic field that interacts with external magnetic field 12 and produces torque which controls spacecraft attitude.

A substantially unbalanced power bus is an electrical power bus that generates a significant magnetic field. When electrical current flows through a conductor, a magnetic field is generated according to the "right-hand rule". In FIG. 1, current flowing in the positive conducting leg (solid line) of power bus 18 desirably flows in the same direction as current flowing in the negative conducting leg (dashed line). Both positive and negative legs have current flowing therein. Magnetic fields are generated by both the positive and negative legs. When this current flows in the same direction in the positive and negative legs, magnetic fields produced by the current flow are additive (i.e. they add together). When currents flow in opposing directions, the magnetic fields are subtractive. When positive and negative legs are physically separated or otherwise arranged so that magnetic fields tend to be additive, an unbalanced bus results and a significant magnetic field is generated. When positive and negative legs are proximate or otherwise arranged so that magnetic fields are subtractive to generate a minimal magnetic field, a balanced bus results.

Figure 2:
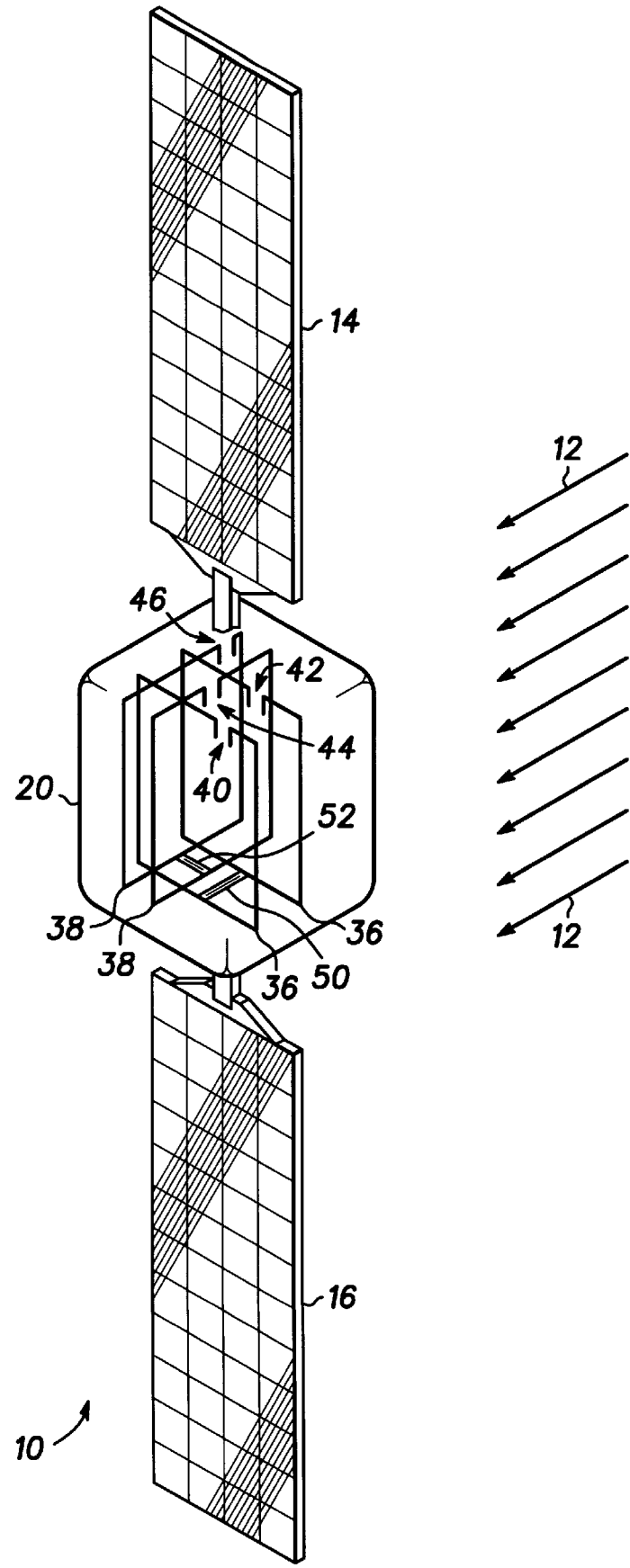
FIG. 2 shows a second perspective view of a spacecraft and includes two unbalanced electrical power busses with two current paths.

FIG. 2 shows a second perspective view of spacecraft 10 located in external magnetic field 12. FIG. 2 depicts spacecraft 10 as including two unbalanced electrical power busses 36 and 38. Power bus 36 has current paths 40 and 42 and power bus 38 has current paths 44 and 46. For clarity, only the positive leg of each current path is shown. A negative leg for each current path of each bus also exists as discussed above in connection with FIG. 1. Those skilled in the art understand that each power bus 36 and 38 generates a magnetic field, and these magnetic fields combine to form a composite local magnetic field which interacts with external magnetic field 12 to produce a torque for attitude control.

To control composite magnetic field direction and thus attitude adjusting torque direction, each of power busses 36 and 38 has two current paths. Power bus 38 first current path 40 and power bus 48 first current path 44 carry current substantially in a clockwise direction while power bus 36 second current path 42 and power bus 38 second current path 46 are for carrying current substantially in a counterclockwise or opposing direction. Clockwise or counterclockwise current paths can be selected through current path switches 50 and 52 for power busses 36 and 38 respectively. For simplicity, first bus current paths 40 and 42 are shown to be perpendicular to second bus current paths 44 and 46. In this embodiment, composite magnetic fields and therefore attitude adjusting torques can be generated in two directions (two dimensional torque generation). Although not shown, in another embodiment, a third power bus is placed orthogonal to first and second power busses 36 and 38. Thus, composite magnetic fields and therefore attitude adjusting torques are generated in any three dimensional direction.

Figure 3:
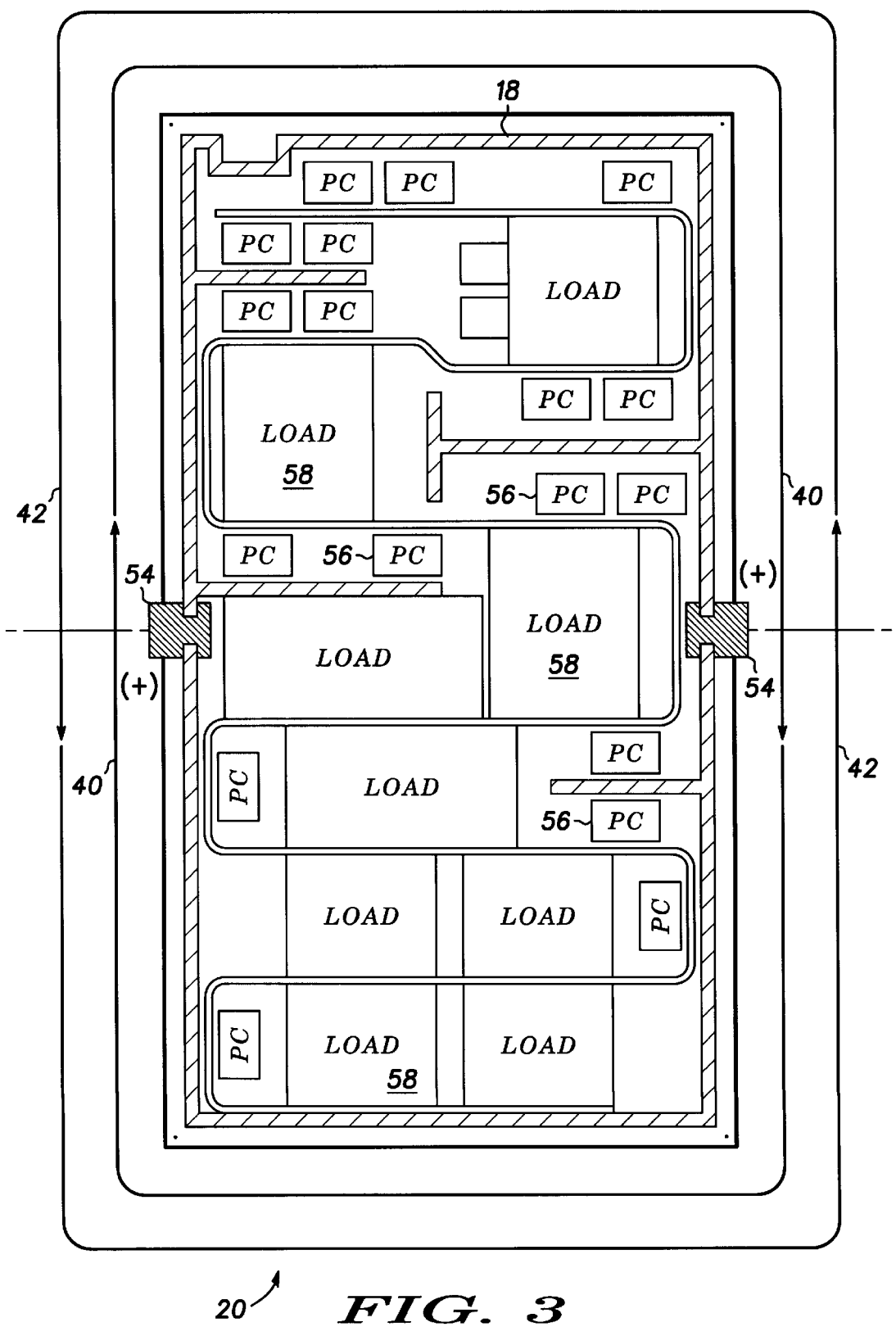
FIG. 3 shows an exemplary cross sectional side-view of a spacecraft body.

FIG. 3 shows an exemplary cross sectional side view of spacecraft body 20. For clarity, only the positive (+) leg of unbalanced electrical power bus 18 is shown. Two current paths 40 and 42 are also shown for unbalanced bus 18 in FIG. 3. First current path 40 is depicted as being substantially a clockwise path and a second current path 42 is depicted as being substantially a counterclockwise path using common conductors. Current path switches 54 couple to the common conductors to allow for selection of either current path 40 or 42 to control current flow direction. As explained in more detail below, by controlling current flow direction, a given amount of current flow can achieve diverse magnetic fields and therefore a variety of attitude control torques. Power converters 56 (PC) couple to bus 18 and supply isolated and regulated current to various electrical loads 58. For this embodiment, electrical power bus 18 encompasses approximately 3.5 square meters and can carry current loads of up to 200 A in either clockwise or counterclockwise current paths 40 or 42. This embodiment is therefore capable of achieving strong and accurate control torques.

Figure 4:
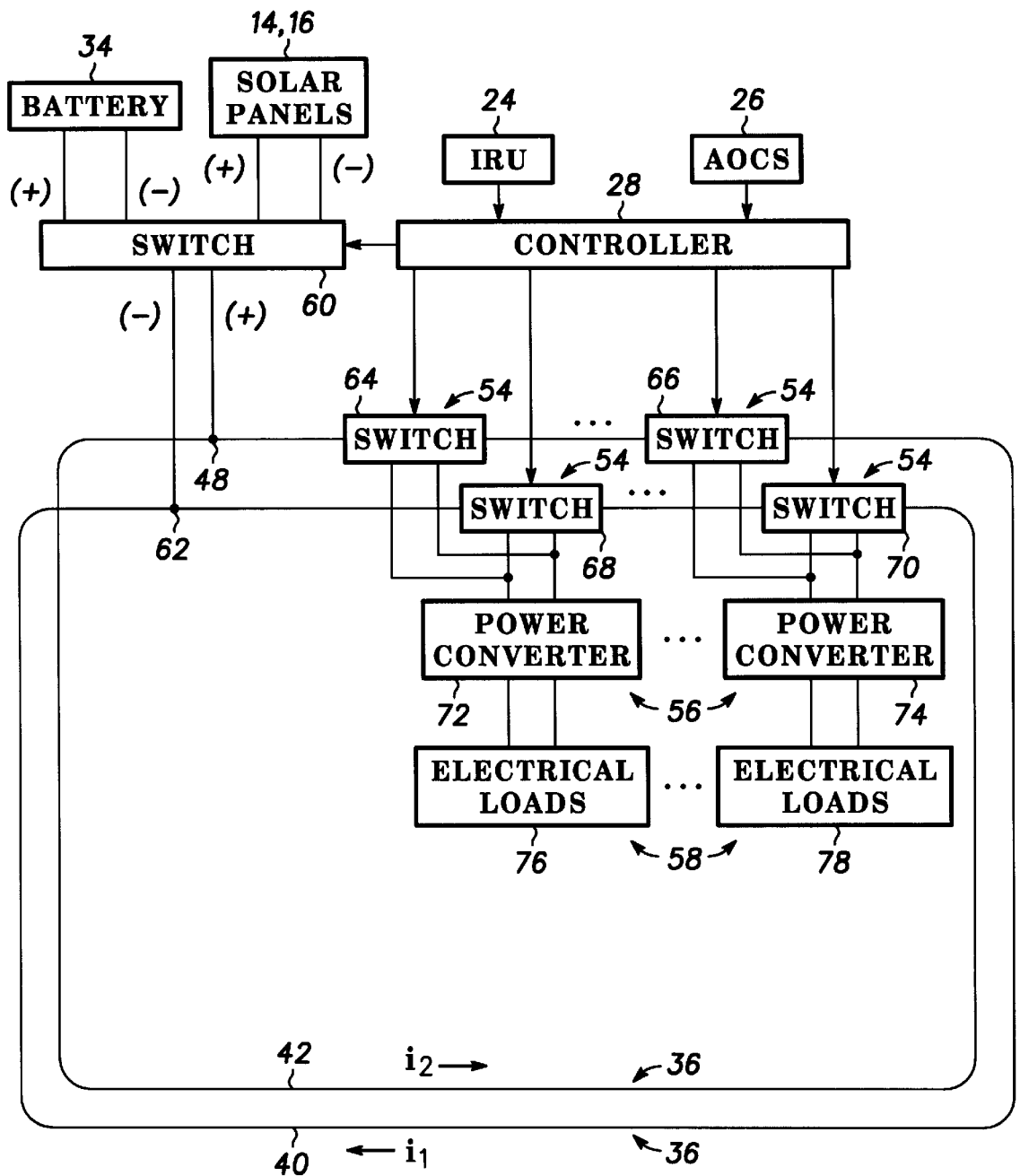
FIG. 4 shows a block diagram of a preferred embodiment of an attitude control system.

FIG. 4 shows a block diagram of a preferred embodiment of an attitude control system for spacecraft 10. The preferred embodiment couples battery 34 and solar panels 14 and 16 to a power source selection switch 60. Power source selection switch 60 is coupled to first ends 48 of first and second current paths 40 and 42 and to second ends 62 of first and second current paths 40 and 42. Inputs of a first switch 64 and a third switch 66 are connected in parallel to first current path 40 ($i_1$) for clockwise (cw) current flow. Inputs of a second switch 68 and a fourth switch 70 are connected in parallel to second current path 42 ($i_2$) for counterclockwise (ccw) current flow. Switches 64, 68, 66 and 70 are collectively referred to below as current path selection switches 54. Outputs of first and second switches 64 and 68 are coupled to an input of a first power converter 72 while outputs of third and fourth switches 66 and 70 are coupled to an input of a second power converter 74. Outputs of first power converter 72 and second power converter 74 are coupled to a first electrical load 76 and a second electrical load 78, respectively. Sensors, such as inertial reference unit (IRU) 24 and attitude orbit control system (AOCS) sensor suite 26 are coupled to a controller 28. Controller 28 is coupled to power source selection switch 60 and to each current path selection switch 54. This allows controller 28 to select current source as well as current path direction for the current flowing to and from electrical loads 58.

As indicated by ellipses in FIG. 4, any number of switches 54, power converters 56 and electrical loads 58 may couple to any number of current paths. In fact, larger numbers of switches 54, power converters 56 and electrical loads 58 are desirable because larger numbers lead to greater redundancy and more precise control over current flow, resulting magnetic fields and attitude adjusting torques.

In this embodiment, controller 28 selects the desired current source through power source selection switch 60. Spacecraft attitude inputs from IRU 24 and AOCS sensor suite 26 are used by controller 28 to determine the present attitude. Controller 28 sets current path switches 54 to route current to power converters 56 and electrical loads 58 through the clockwise current path 40 and/or counterclockwise current path 42, so as to generate an appropriate magnetic field to affect attitude adjustments. Each power converter 56 has access to both current paths 40 and 42. Controller 28 sets current path switches 54 so that an average composite local magnetic field results. Thus, controller 28 accurately generates a local magnetic field that interacts with external magnetic field 12 (FIG. 1) to produce a desired attitude control torque.

Using this approach, attitude torque generation is a low cost, high reliability, side effect of having an electrical power bus with multiple power converters 56. Since current is continuously flowing in the power bus, spacecraft attitude adjustments can be made at any time. Attitude adjustments do not require solar power. Additionally, system reliability increases since a failure in any single current path switch 54 can be routed around by selecting another current path switch to that power converter.

Figure 5:
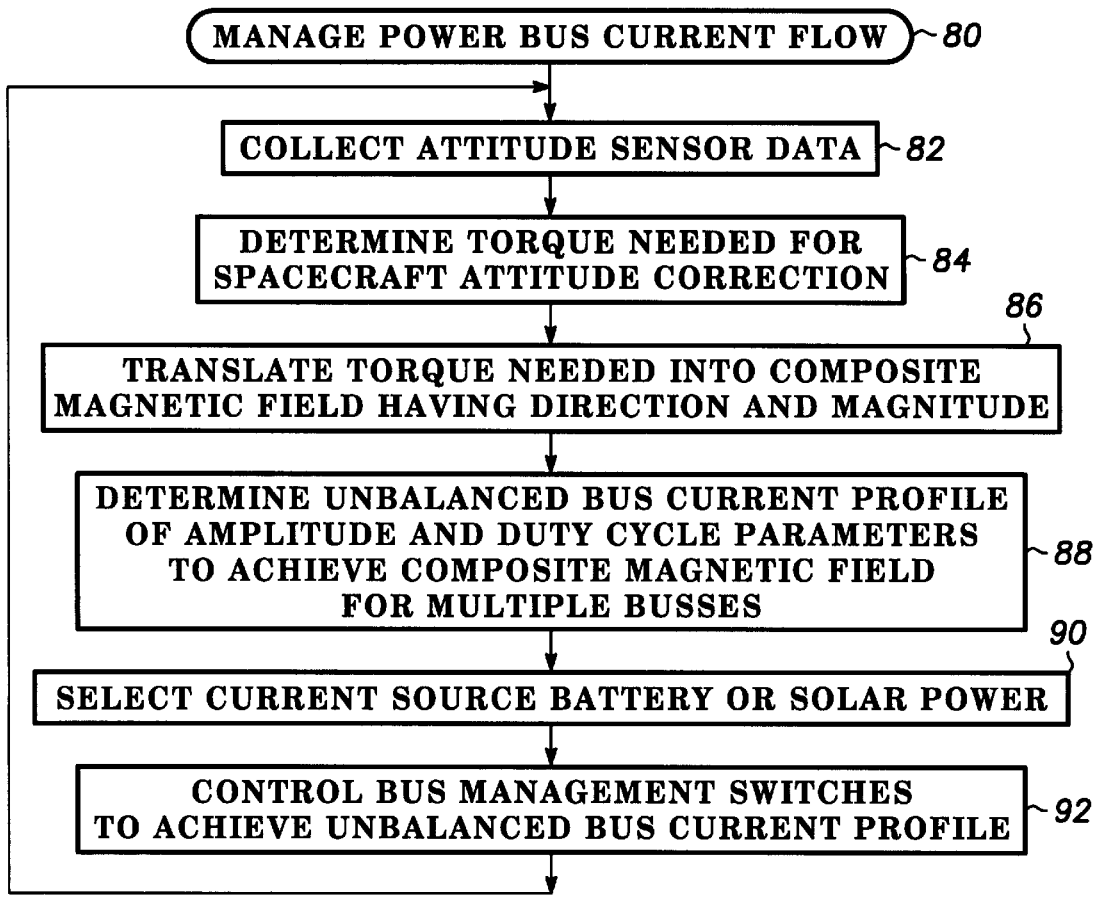
FIG. 5 shows a flowchart of a control process performed to manage power bus current flow.

FIG. 5 shows a flowchart of a process performed by controller 28. Controller 28 includes one or more microprocessors or like circuits and related peripherals configured to perform, among other things, a manage power bus current flow process 80. Referring to FIGS. 4 and 5, during process 80, controller 28 performs a task 82 to collect attitude sensor data from IRU 24 and AOCS sensor suite 26. The torque needed to correct the spacecraft attitude is calculated following task 82 in a task 84. This corrective torque is calculated in a manner known to those skilled in the art of spacecraft attitude control. Next, this corrective torque is translated into a desired composite magnetic field, defined in both magnitude and direction in a task 86. After task 86, a task 88 determines an unbalanced bus current profile for current paths 40 and 42. This profile defines electrical current magnitude and duty cycle parameters to achieve the composite magnetic field. Next, in a task 90 battery or solar power is selected through switch 60 to drive current paths 40 and 42, depending on availability of solar power. Then in a task 92, current path switches 54 are set for direction and duration to achieve the unbalanced bus current profile determined above in task 88. A resulting attitude adjustment is input back into the controller processing loop via IRU 24 and AOCS sensor suite 26 to achieve more accurate corrections for subsequent iterations.

Figure 6:
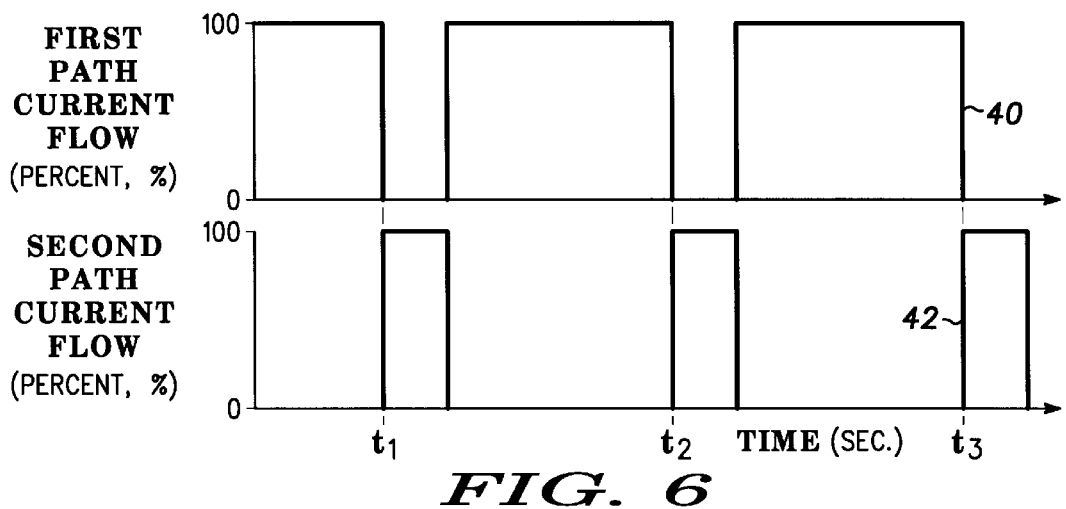
FIG. 6 shows a graph depicting current flow versus time in a first exemplary embodiment.
Figure 7:
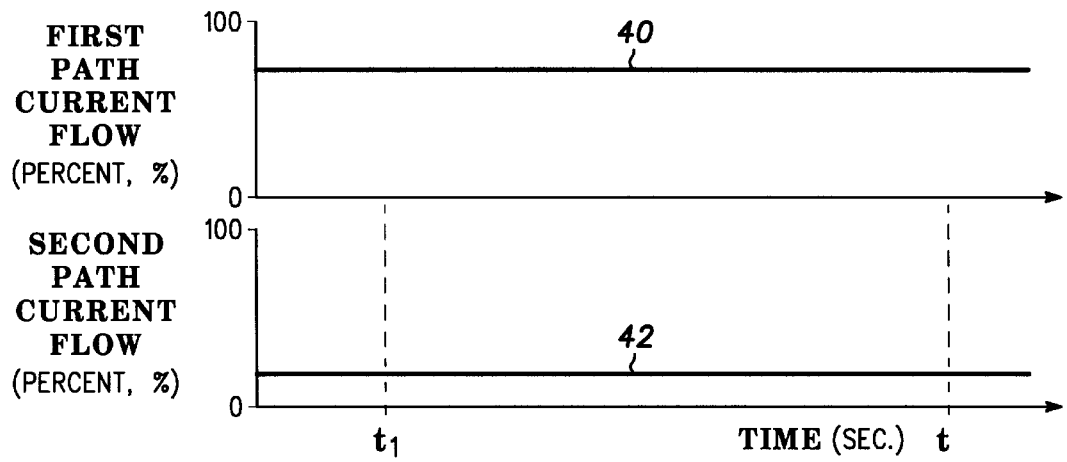
FIG. 7 shows a graph depicting current flow versus time in a second exemplary embodiment.
Figure 8:
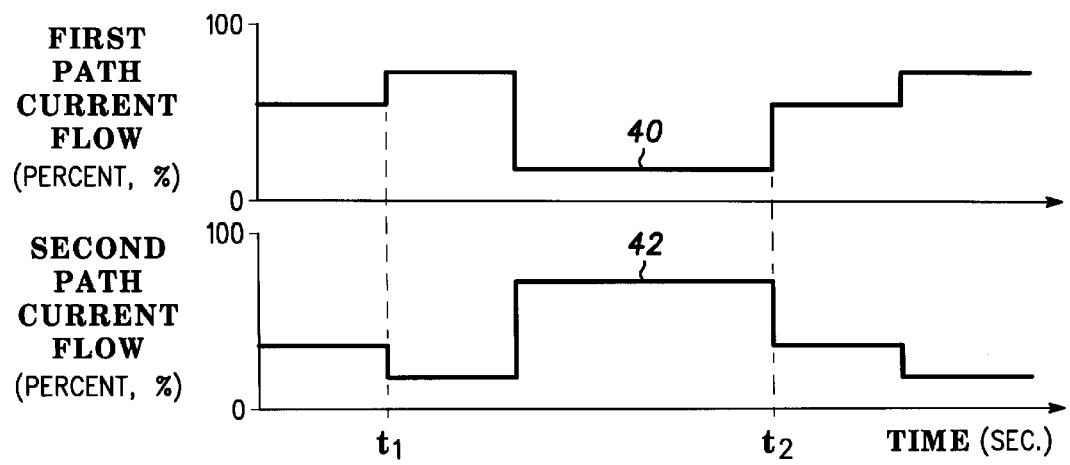
FIG. 8 shows a graph depicting current flow versus time in a third exemplary embodiment.

Graphs depicting current flow versus time for three separate exemplary embodiments are shown in FIG. 6, FIG. 7 and FIG. 8. FIGS. 6–8 explain various bus current profiles that can be determined in task 88 and implemented in task 92. Each of FIGS. 6–8 depicts an embodiment having an unbalanced power bus 18 with two opposing current paths, such as current paths 40 and 42. In the FIG. 6 example, all the current (100%) flowing in power bus 18 flows in only one of current paths 40 and 42 at any given time. The duration for which current flows in each of opposing current paths 40 and 42 is controlled by controller 28 in accordance with the profile determined in task 88. Therefore two magnetic fields of equal strength but in opposite directions will be generated for different lengths of time. For this example, the duration or duty cycle for each current path is controlled to give the desired magnetic field.

Referring to FIG. 7, a second exemplary embodiment has a first portion, for example 80%, of the total current available flowing in the first current path 40 and the remaining portion, for example 20%, in the second current path 42. The first and second portions are controlled by controller 28. In this embodiment current flows continuously in each of the opposing current paths. Therefore, two magnetic fields of unequal strengths in opposite directions interact to generate a new or resultant magnetic field. The strength of this resultant magnetic field is the difference of the two magnetic fields generated by current flows 40 and 42 and is in the direction of the stronger of the two fields.

FIG. 8 shows a third exemplary embodiment that also yields a local magnetic field and thus an attitude control torque as a result of current flow in paths 40 and 42. In this third embodiment, current flows continuously in current paths 40 and 42, but magnitudes of currents flowing in current paths 40 and 42 increase and decrease in accordance with a duty cycle profile. Combinations of the different currents discussed in conjunction with FIGS. 6–8 or other current profiles in combination could alternatively occur. The unbalanced current flow in the first and second current paths 40 and 42 result in the generation of a new or resultant magnetic field. The resultant magnetic field interacts with other local magnetic fields (other power busses) to produce a composite magnetic field that interacts with an external magnetic field and can accurately produced a predictable and controllable torque.

FIGS. 4–8 and the corresponding discussion presented herein are directed to a single unbalanced bus for the sake of clarity. However, in the preferred embodiments, multiple unbalanced busses are utilized and controlled in the manner described herein. As discussed above in connection with FIG. 2, these multiple busses allow generation of a three dimensional torque. Moreover, the useful control of multiple unbalanced busses leads to more precise control of torque magnitude and direction.

In summary, an unbalanced spacecraft power bus uses its current to intentionally produce a local magnetic field that interacts with an external magnetic field and produces a significant and useful torque. The present invention further discloses a power bus having two current paths and power converters having dual switches, allowing current flow in opposing directions and thus controlling the direction of the local magnetic field.

Although the preferred embodiments of the invention have been illustrated and described in detail, it will be readily apparent to those skilled in the art that various modifications may be made therein without departing from the spirit of the invention or from the scope of the appended claims.

What is claimed is:

1. An attitude control system for a spacecraft said attitude control system comprising:
   an first electrical power bus configured to supply power to a plurality of electrical loads of said spacecraft and further configured to generate a first local magnetic field which interacts with an external magnetic field; and
   a controller coupled to said first electrical power bus, said controller being configured to manage said first electrical power bus to control said first local magnetic field such that interaction between said first local magnetic field and said external magnetic field adjusts attitude of said spacecraft.

2. An attitude control system as claimed in claim 1, wherein said first electrical power bus is configured to generate said first local magnetic field with a substantially unbalanced electrical current.

3. An attitude control system as claimed in claim 2, said attitude control system further comprising
   a battery configured to provide electrical power for generation of
   said substantially unbalanced electrical current.

4. An attitude control system as claimed in claim 2, said attitude control system further comprising
   a solar panel configured to provide electrical power for generation of said substantially unbalanced electrical current.

5. An attitude control system as claimed in 1 wherein said first electrical power bus is located proximate to an external body surface of said spacecraft.

6. An attitude control system as claimed in claim 1, wherein said first electrical power bus includes a first current path and a second current path.

7. An attitude control system as claimed in claim 6, further comprising:

a power converter coupled to said controller;

a first switch coupled to said power converter and said first current path of said first electrical power bus; and a second switch coupled to said power converter and said second current path of said electrical power bus.

8. An attitude control system as claimed in claim 7 wherein:

said first current path is configured to allow a first electrical current to flow in a first direction said second current path is configured to allow a second current to flow in a second direction that is substantially opposite to said first direction; and said controller is configured to control said first and second switches to manage a duration for which said first electrical current flows in said first current path and said second electrical current flows in said second current path.

9. An attitude control system as claimed in claim 7 said attitude control system further comprising:

a second power converter coupled to said controller;

a third switch coupled to said second power converter and said first current path; and a fourth switch coupled to said second power converter and said second current path.

10. An attitude control system as claimed in claim 9 wherein:

said first current path is configured to allow a first electrical current to flow in a first direction said second current path is configured to allow a second current to flow in a second direction that is substantially opposite to said first direction; and said controller is configured to control said first switch, second switch, third switch and fourth switch to manage selection of said first current path and second current path for supplying said first electrical current and said second electrical current to said first power converter and second power converter.

11. An attitude control system as claimed in claim 6 wherein:

said first current path has first and second ends and said second current path has first and second ends;

said first switch couples to said first end of said first current path and to said second end of said second current path;

said second switch couples to said second end of said first current path and to said first end of said second current path; and said attitude control system additionally comprises a power source coupled to said first switch and to said second switch.

12. An attitude control system as claimed in claim 1, further comprising a second electrical power bus generating a second local magnetic field.

13. A method for controlling attitude of a spacecraft, comprising the steps of:

(a) supplying power to a plurality of electrical loads of said spacecraft with a first electrical power bus;

(b) generating a first local magnetic field with said first electrical power bus which interacts with an external magnetic field; and (c) managing said first electrical power bus to control said first local magnetic field such that interaction between said first local magnetic field and said external magnetic field adjusts attitude of said spacecraft.

14. A method for controlling attitude of a spacecraft as claimed in claim 13, wherein step (b) is generating said first local magnetic field with a substantially unbalanced electrical current.

15. A method for controlling attitude of a spacecraft as claimed in claim 13, wherein step (c) is performed by selecting a duration for which a first electrical current flows in a first current path of said first electrical power bus and a second electrical current flows in a second current path of said first electrical power bus.

16. A method for controlling attitude of a spacecraft as claimed in claim 13, further comprising the steps of:

(d) supplying power to a second plurality of electrical loads of said spacecraft with a second electrical power bus;

(b) generating a second local magnetic field with said second electrical power bus which interacts with said external magnetic field; and (c) managing said second electrical power bus to control said second local magnetic field such that interaction between said second local magnetic field and said external magnetic field adjusts attitude of said spacecraft.

17. An apparatus for providing attitude control of a spacecraft using a power subsystem, said apparatus comprising:

an first power bus of the power subsystem, said first power bus configured to supply power to a plurality of electrical loads of said spacecraft and configured to carry a first current and a second current that generate a first local magnetic field which interacts with an external magnetic field; and a controller configured to manage said first current and said second current carried by said first power bus, said controller managing said first current and said second current of said first power bus to control said first local magnetic field for adjusting attitude of said spacecraft.

18. An apparatus for providing attitude control of a spacecraft using a power subsystem as claimed in claim 17, said apparatus further comprising:

an second power bus of the power subsystem, said second power bus configured to supply power to a second plurality of electrical loads of said spacecraft and configured to carry a third current and a fourth current that generate a second local magnetic field which interacts with said external magnetic field.

19. An apparatus for providing attitude control of a spacecraft using a power subsystem as recited in claim 18, wherein said controller is configured to manage said third current and said fourth current carried by said second power bus, said controller managing said third current and said fourth current of said second power bus to control said second local magnetic field for adjusting attitude of said spacecraft.

* * * * *